UNITED STATES PATENT OFFICE.

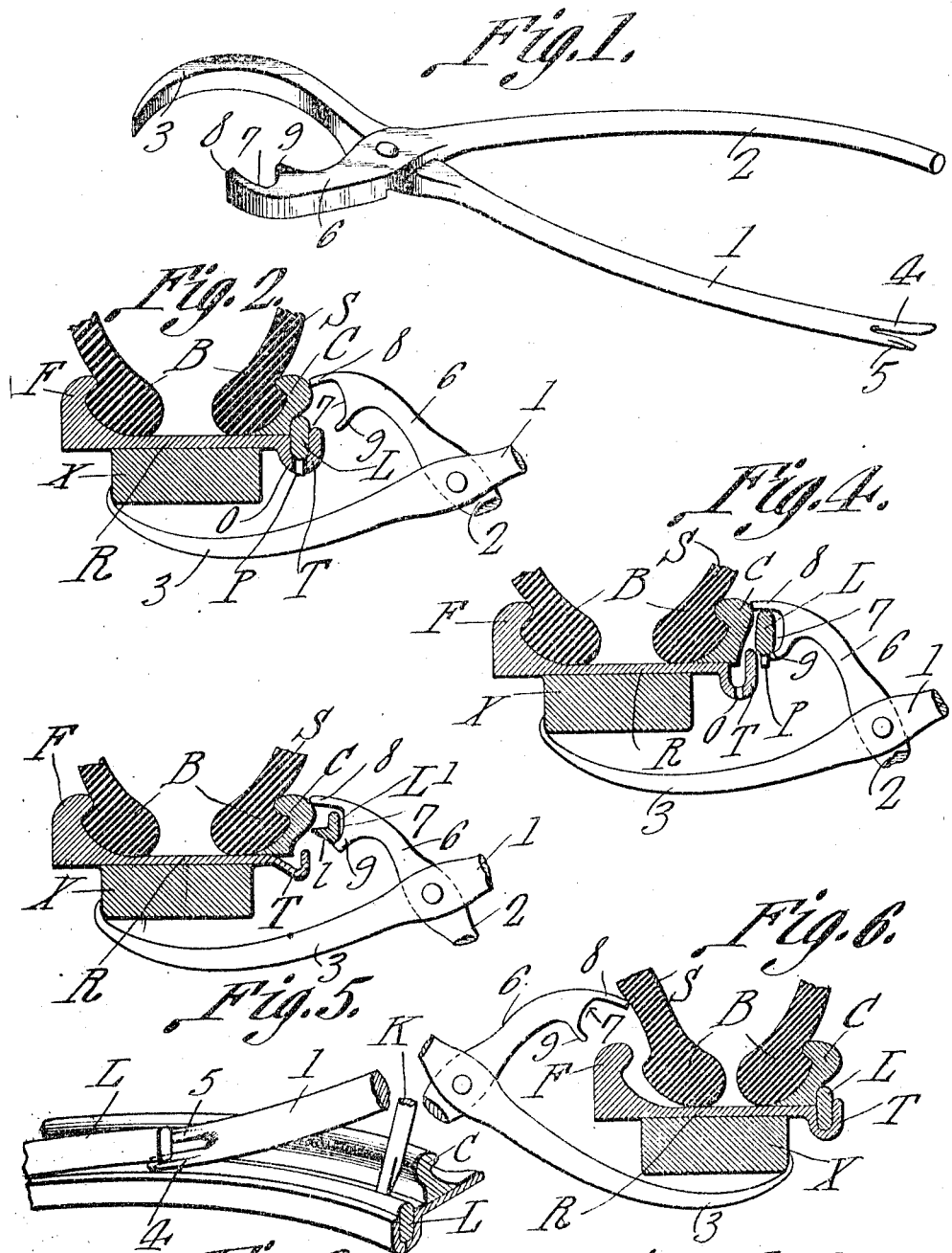

PATRICK E. KENNEY, OF CELINA, OHIO.

TIRE-TOOL.

1,020,288.  Specification of Letters Patent.   Patented Mar. 12, 1912.

Application filed February 4, 1911. Serial No. 606,662.

*To all whom it may concern:*

Be it known that I, PATRICK E. KENNEY, a citizen of the United States, residing at Celina, in the county of Mercer and State of Ohio, have invented a new and useful Tire-Tool, of which the following is a specification.

This invention relates to tire tools such as are employed in mounting and dismounting automobile tires.

In holding what is known as a "quick detachable tire" assembled with the rim, two rings are employed, one of which interlocks with one of the beads of the casing or sheath, and the other of which engages a peripheral channel disposed at one edge of the rim, and serves to lock the first named ring firmly in position against possibility of accidental disconnection. As will be apparent, this locking ring must be not only resilient, but comparatively stiff, in order to enable it to withstand the spreading strains to which it will be subjected in use, and, with tires as now generally constructed, to remove this locking ring, when repairs are necessary to the inner tube, requires the output of both force and labor, and generally the services of a workman familiar with the operation.

It is the object of the present invention in a ready and practical manner to render it easy for any person possessing the requisite strength to dismount a tire, and as readily remount it when repairs are necessary, the operation being accomplished with the output of but a small amount of labor, inconvenience and loss of time.

With these and other objects in view as will appear as the nature of the invention is better understood, the same consists, generally stated, in a tire tool comprising a pair of crossed and pivoted levers, one of which terminates in a relatively long inward curved felly engaging hook, and the other in a relatively short jaw having a terminal crotch defining two bills of unequal length, the crotch being designed to receive the locking ring, and the longer bill to force the detachable flange to one side when the locking ring is to be positioned. In addition, one of the levers terminates in a fork having tines of unequal length, the longer of which is designed to be inserted between the end of the locking ring and the contiguous wall of the channel, and the shorter to be inserted between the locking ring and detachable flange, whereby upon downward pressure being applied to the tool, the end of the locking ring engaged by the fork will be forced out of the channel.

The invention consists further in the various novel details of construction of a tire tool, as will be hereinafter fully described and claimed.

In the accompanying drawings forming a part of this specification, and in which like characters of reference indicate corresponding parts:—Figure 1 is a view in perspective of a tire tool constructed in accordance with the present invention. Fig. 2 is a transverse sectional view through a portion of an automobile tire, showing the first step observed in the removal of the tire. Fig. 3 is a perspective detail view showing the manner in which the fork of one of the levers operates to remove the locking ring from the rim. Fig. 4 is a view similar to Fig. 2 showing the procedure observed in replacing the locking ring to position. Fig. 5 is a view similar to Fig. 4, showing a slightly modified form of channel and locking ring. Fig. 6 is a view similar to Fig. 5 showing the manner in which the tool is manipulated for detaching the sheath from a rim or detachable flange should it adhere thereto from rust or other cause.

The tool comprises two crossed and pivoted levers 1 and 2, the former of which terminates at one end in a relatively long inward curved felly engaging hook 3, the end of which defines a tooth for biting the felly and at its other end in a fork, the tines 4 and 5 of which are curved laterally in the same direction, are of unequal length, and are both chisel pointed, the bevels of the walls of the longer tine being oblique to the pivot of the levers, and the bevels of the walls of the shorter tine being at right angles to the pivot, and the crotch of the fork being disposed transversely of the inner walls of the lever 2, for a purpose that will presently appear. The lever 2 terminates at one end in a jaw 6 having a terminal crotch 7 that defines two bills 8 and 9 of unequal length, the crotch being designed to receive the locking ring I when it is to be positioned within the channel, and the inner and longer bill 8 will force the detachable flange C out of engagement with the locking ring, when the latter is to be positioned, as shown in Fig. 4.

As shown in Figs. 2, 4, 5 and 6, S designates the sheath of an automobile tire, having the usual beads B.

The rim of the automobile wheel is designated by the letter R, the same being provided at one edge with an outstanding circumferential flange F for engaging the bead on one side of the sheath, and at the other edge the rim is provided with an instanding trough-shaped seat T. The rim R is mounted upon the usual felly X. The bead B on the side of the rim adjacent the seat T is adapted to be engaged by the detachable flange C which is held in place by the locking ring L, the locking ring being adapted to engage in the seat T and having the usual inwardly extending projection P that is designed to engage the orifice O in the seat. This construction is common in automobile wheels, and need not be described in further detail.

With the parts thus constructed, the mode of dismounting the sheath is as follows. The tire having been entirely deflated, the tool is applied as shown in Fig. 2, and by swinging the levers upon the tooth of the felly engaging hook and upon their own pivots will cause the bill 8 to force or displace the adjacent detachable flange inward and thus provide a space between the detachable flange and the locking ring L to permit the insertion of a cold chisel K of the ordinary type, and this will hold the detachable flange and locking ring spaced apart to permit the insertion of the fork at the end of the lever 1 which will assume the position shown in Fig. 3, after the lever is swung that is to say with the longer or inner tine inserted under the locking ring, and the shorter or outer tine between the locking and the detachable flange, and upon downward and outward pressure being applied to the tool, the locking ring will be forced from its seat. The cold chisel is now removed and is inserted under the ends of the locking ring, and the other tine is forced in between the rim and the locking ring, and the latter is pried farther out, and this operation is repeated at intervals around the rim until a sufficient length of the ring has been detached to render it possible to complete the operation by hand. After the necessary repairs to the inner tube have been made, and the sheath and detachable flange assembled with the rim, the tool is manipulated as shown in Fig. 4, which will operate to force the adjacent detachable flange inward to carry the locking ring inward and permit the projection P of the locking ring to enter the orifice O of the seat, and by repeating this operation of forcing the locking ring against the detachable flange, and with the aid of a hammer, the locking ring may easily and readily be seated.

On some quick detachable tires, the locking ring L' Fig. 5 is provided with a flange l, and to dismount this character of locking ring, the long tine is inserted under the ring, the long tine is inserted under the flange and the short tine above it so that the flange is in the fork, and by bearing down upon the tool, the end of the locking ring will be lifted out of the channel, and as the tines pass one above and the other below the flange the ring will be prevented from slipping back. It is to be understood that the crotch 7 must be large and deep enough to engage the entire locking ring in remounting otherwise the latter would fall down and out.

It will be seen from the foregoing description, that although the improvements herein defined are simple in character, that they will be thoroughly efficient for the purpose designed, and will result in the production of a tool that will fill a long felt want, and one that may be operated by a person of ordinary mechanical ability.

I claim:

1. A tire tool comprising a pair of crossed and pivoted levers, one of which has the end thereof hooked inwardly to define a felly engaging tooth, and the other lever terminating in a short jaw having a crotch at the end thereof defining an outer and an inner bill, whereby when the said tooth is engaged with the felly of an automobile wheel the levers may be swung relative to the wheel and each other to bring the outer bill against the clenching ring to displace same inwardly, the shorter bill serving to carry the locking ring in position as the clenching ring is forced inwardly.

2. A tire tool comprising a pair of crossed and pivoted levers, one of which terminates in a felly engaging hook, and the other lever terminating in a short jaw having an outer and an inner bill which are adapted to engage the detachable flange and locking ring of an automobile wheel, whereby the locking ring is carried in position as the detachable flange is forced inwardly.

In testimony that I claim the foregoing as my own, I have hereto affixed my signature in the presence of two witnesses.

PATRICK E. KENNEY.

Witnesses:
JOHN RAUDABAUGH,
ADELAIDE KENNEY.